(12) United States Patent
Shimizu et al.

(10) Patent No.: US 8,979,988 B2
(45) Date of Patent: Mar. 17, 2015

(54) INK SET FOR INKJET RECORDING, RECORDING METHOD, AND COLORED BODY USING SAME

(75) Inventors: Shinsuke Shimizu, Tokyo (JP); Tadahiko Tabe, Tokyo (JP); Yoshiki Akatani, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/820,992

(22) PCT Filed: Aug. 31, 2011

(86) PCT No.: PCT/JP2011/069758
§ 371 (c)(1),
(2), (4) Date: Jun. 3, 2013

(87) PCT Pub. No.: WO2012/032986
PCT Pub. Date: Mar. 15, 2012

(65) Prior Publication Data
US 2013/0249994 A1  Sep. 26, 2013

(30) Foreign Application Priority Data

Sep. 6, 2010 (JP) ................... 2010-198617

(51) Int. Cl.
| | |
|---|---|
| *C09D 11/02* | (2014.01) |
| *B41J 2/01* | (2006.01) |
| *C09D 11/328* | (2014.01) |
| *C09B 29/01* | (2006.01) |
| *C09B 29/20* | (2006.01) |
| *C09B 47/06* | (2006.01) |
| *C09D 11/40* | (2014.01) |
| *B41M 5/00* | (2006.01) |

(52) U.S. Cl.
CPC ............ *C09D 11/328* (2013.01); *B41M 5/0023* (2013.01); *C09B 29/0007* (2013.01); *C09B 29/0014* (2013.01); *C09B 29/20* (2013.01); *C09B 47/065* (2013.01); *C09D 11/40* (2013.01)
USPC ...................... 106/31.48; 106/31.49; 347/100

(58) Field of Classification Search
CPC ............................. C09D 11/328; C09D 11/40
USPC ............................ 106/31.48, 31.49; 347/100
See application file for complete search history.

(56) References Cited

U.S. PATENT DOCUMENTS

| | | | | |
|---|---|---|---|---|
| 4,554,555 | A * | 11/1985 | Aruga et al. ................. | 106/31.5 |
| 4,818,285 | A * | 4/1989 | Causley et al. ............. | 106/31.43 |
| 5,185,034 | A * | 2/1993 | Webb et al. ................. | 106/31.43 |
| 5,772,742 | A * | 6/1998 | Wang .......................... | 106/31.27 |
| 5,776,230 | A * | 7/1998 | Gundlach et al. ........... | 106/31.43 |
| 5,980,623 | A * | 11/1999 | Hiraoka et al. ............. | 106/31.49 |
| 6,454,844 | B1 * | 9/2002 | Kanaya ....................... | 106/31.48 |
| 6,508,871 | B1 | 1/2003 | Kato et al. | |
| 6,779,881 | B2 * | 8/2004 | Ito et al. ..................... | 106/31.27 |
| 6,843,838 | B2 * | 1/2005 | Zimmer et al. ............. | 106/31.48 |
| 7,264,663 | B2 * | 9/2007 | Gremaud et al. ........... | 106/31.48 |
| 2005/0211133 | A1 * | 9/2005 | Chou et al. .................. | 106/31.48 |

FOREIGN PATENT DOCUMENTS

| | | |
|---|---|---|
| CN | 1219833 C | 9/2005 |
| JP | S59-106989 | 6/1984 |
| JP | H01-152177 | 6/1989 |
| JP | H05-214259 | 8/1993 |
| JP | H10-329403 | 12/1998 |
| JP | H11-199815 | 7/1999 |

(Continued)

OTHER PUBLICATIONS

English translation of JP 2004/083892; Mar. 2004.*
MSDS Acid Red 138; no date available.*
Reactive Red 40 structure, no date available.*
Office Action issued in Chinese Patent Application No. 201180042457.3 on Dec. 31, 2013.

*Primary Examiner* — Helene Klemanski
(74) *Attorney, Agent, or Firm* — Knobbe Martens Olson & Bear LLP

(57) ABSTRACT

A dye ink set for ink jet recording, which has a wide color gamut, particularly for the hue range of magenta, blue, and cyan, and which has good ejection stability properties. The ink set includes ink compositions of two colors, a magenta ink composition and a cyan ink composition which contain a dye, water, and a water-soluble organic solvent, and the magenta ink composition contains a compound represented by formula (1) below or a salt thereof.

8 Claims, No Drawings

(56) References Cited

FOREIGN PATENT DOCUMENTS

| JP | 2000-109737 | 4/2000 | |
|---|---|---|---|
| JP | 2000-303009 | 10/2000 | |
| JP | 2001-192591 | 7/2001 | |
| JP | 2002/348504 | * | 12/2002 |
| JP | 2003-128965 | | 5/2003 |
| JP | 2003-138169 | | 5/2003 |
| JP | 2003-238870 | | 8/2003 |
| JP | 2004-083892 | | 3/2004 |
| JP | 4497448 | | 7/2010 |

* cited by examiner

INK SET FOR INKJET RECORDING, RECORDING METHOD, AND COLORED BODY USING SAME

This application is the U.S. National Phase under 35 U.S.C. §371 of International Application PCT/JP2011/069758, filed Aug. 31, 2011, designating the U.S., and published in Japanese as WO 2012/032986 on Mar. 15, 2012, which claims priority to Japanese Patent Application No. 2010-198617, filed Sep. 6, 2010, the entire contents of which are incorporated herein by reference.

TECHNICAL FIELD

The present invention relates to an ink set for ink jet recording, and an ink jet recording method using the same. More specifically, the present invention relates to a dye ink set for ink jet recording that is superior in coloring properties, and in particular, relates to an ink set for ink jet recording that is superior in color reproducibility in a hue range of magenta-blue-cyan and that exhibits favorable discharge stability, and an ink jet recording method using the same.

BACKGROUND ART

In a recording method by an ink jet printer, which is one typical method among a variety of color recording methods, recording is executed by generating ink droplets, which adhere onto any of a variety of record-receiving materials (e.g., paper, film, and fabric, etc.). According to this method, a recording head is not brought into direct contact with the record-receiving material; therefore, generation of noise can be reduced thus achieving silent recording. In addition, due to having the feature of reduced size and increased speed being readily achievable, prevalence in recent years has been in rapid progress. Accordingly, great advancement of the method hereafter is expected.

Aqueous inks prepared by dissolving a water-soluble dye in an aqueous medium have been used as conventional inks for fountain pens, felt pens etc., and inks for ink jet printing. Into these inks is generally added a water-soluble organic solvent in order to prevent pen tips or ink discharge nozzles from clogging with the ink. In addition, for these inks, demanded are ability to generate a recorded image with satisfactory density, probability of avoiding occurrence of clogging at the pen tips and nozzles, favorable drying characteristics on the record-receiving materials, suppression of bleeding, superior storage stability, and the like. Furthermore, water soluble dyes for use in the inks are required to have high solubility particularly in water, and high solubility in water soluble organic solvents added to the inks. Moreover, formed images are desired to have image fastness properties such as water resistance and light resistance, as well as color reproducibility.

Of these, in regard to the color reproducibility, an ink set including four dye inks each of a different color, i.e., black, yellow, magenta and cyan has been generally used. Thus, development of an ink set which is capable of providing recorded matters having high quality and high fastness properties, and is also superior in discharge stability has been demanded. To meet such demands, a variety of ink sets for ink jet recording have been proposed thus far; however, a broad hue range visible by human eyes cannot be completely reproduced by conventional ink sets, whereby a problem of narrow color reproducible range has existed.

In attempts to solve this problem, Patent Documents 1 to 8 propose an ink set for ink jet recording that is a combination of dye inks of yellow, magenta and cyan, each having perceived chromaticity indices "a" value and "b" value on a printing paper falling within a specific range. However, the inks disclosed in Patent Documents 1 to 8 are reportedly inferior in color reproducibility in a hue range of magenta-blue-cyan. Accordingly, an ink set containing a direct dye, an acidic dye, or a reactive dye as a coloring agent, and having sufficiently broad color reproducible range in this hue range has not yet been provided.

On the other hand, as magenta coloring agents suited for dye inks for ink jet recording, for example, C. I. Direct Red 227 disclosed in Patent Documents 1, 5 and 10, a compound represented by the formula (1), etc., have been known, and as cyan coloring agents, for example, C. I. Direct Blue 199 disclosed in Patent Documents 2 to 9, as well as C. I. Direct Blue 86 (a+b+c+d=2), 87 (a+b+c+d=3), C. I. Acid Blue 249 (a+b+c+d=4), etc., as compounds represented by the general formula (2) have been known.

Patent Document 1: Japanese Unexamined Patent Application, Publication No. H5-214259
Patent Document 2: Japanese Unexamined Patent Application, Publication No. H10-329403
Patent Document 3: Japanese Unexamined Patent Application, Publication No. H11-199815
Patent Document 4: Japanese Unexamined Patent Application, Publication No. 2000-109737
Patent Document 5: Japanese Unexamined Patent Application, Publication No. 2001-192591
Patent Document 6: Japanese Unexamined Patent Application, Publication No. 2003-128965
Patent Document 7: Japanese Unexamined Patent Application, Publication No. 2003-138169
Patent Document 8: Japanese Unexamined Patent Application, Publication No. 2003-238870
Patent Document 9: Japanese Unexamined Patent Application, Publication No. 2000-303009
Patent Document 10: Japanese Patent Publication No. 4497448

DISCLOSURE OF THE INVENTION

Problems to be Solved by the Invention

An object of the present invention is to provide a dye ink set for ink jet recording that is superior in color reproducibility within a color reproducible range, particularly within a hue range of magenta-blue-cyan, and is also favorable in discharge stability.

Means for Solving the Problems

The present inventors thoroughly investigated in order to solve the foregoing problems, and consequently found that an ink set for ink jet recording including at least two ink compositions of magenta and cyan each containing a specific dye as a coloring agent is superior in color reproducibility in a hue range of particularly magenta-blue-cyan, and is also superior in discharge stability. Thus, the present invention was accomplished.

More specifically, the present invention relates to the following aspects.

An ink set for ink jet recording according to a first aspect includes two ink compositions each of a different color of a) a magenta ink composition and b) a cyan ink composition, each containing a dye, water, and a water soluble organic solvent, and the magenta ink composition a) containing a compound represented by the following formula (1) or a salt thereof.

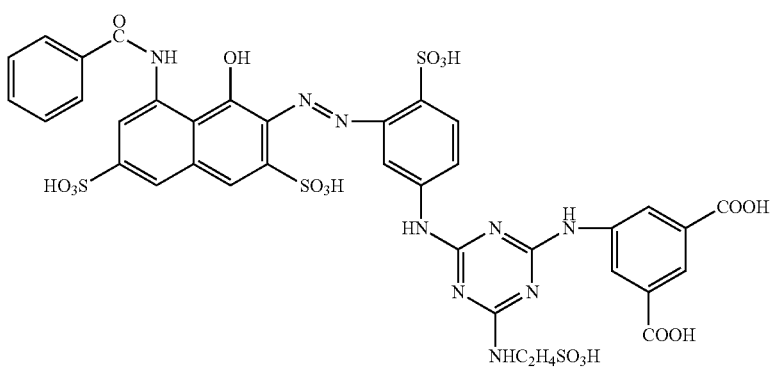

(1)

According to a second aspect, the cyan ink composition b) contains as a coloring agent a compound represented by the following general formula (2) or a salt thereof in the ink set for ink jet recording according to the first aspect.

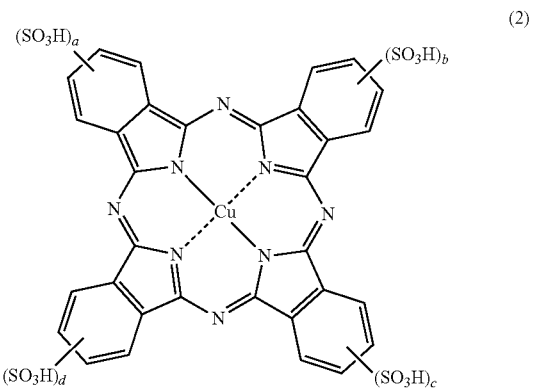

(2)

In the general formula (2), a, b, c and d are 0 or 1; the sum of a, b, c and d is no less than 1 and no greater than 4; and an average value of the sum is 2 to 4.

According to a third aspect, a total content of the coloring agent in a total mass of the magenta ink composition a) is 0.5 to 10% by mass, and a total content of the coloring agent in a total mass of the cyan ink composition b) is 0.5 to 10% by mass in the ink set for ink jet recording according to the first or second aspect.

According to a fourth aspect, a total content of the coloring agent in a total mass of the magenta ink composition a) is 2 to 6% by mass, and a total content of the coloring agent in a total mass of the cyan ink composition b) is 2 to 6% by mass in the ink set for ink jet recording according to the first or second aspect.

An ink jet recording method according to a fifth aspect is carried out using the ink set for ink jet recording according to any one of the first to fourth aspects, the method including discharging ink droplets of each ink composition included in the ink set, in response to recording signals to allow the droplets to adhere onto the record-receiving material thereby executing recording.

According to a sixth aspect, the record-receiving material is a communication sheet in the ink jet recording method according to the fifth aspect.

A colored body according to a seventh aspect is obtained by coloring with the ink set for ink jet recording according to any one of the first to fourth aspects.

According to an eighth aspect, the coloring is carried out using an ink jet printer in the colored body according to the seventh aspect.

An ink jet printer according to a ninth aspect is equipped with a vessel containing each ink composition included in the ink set for ink jet recording according to any one of the first to fourth aspects.

Effects of the Invention

According to the present invention, an ink set for ink jet recording can be provided which is superior in color reproducibility in a hue range of particularly magenta-blue-cyan, and is also superior in discharge stability. In addition, an ink jet recording method can be provided in which such an ink set for ink jet recording is used.

PREFERRED MODE FOR CARRYING OUT THE INVENTION

Hereinafter, the present invention will be explained in detail. Unless otherwise stated in particular herein, acidic functional groups such as sulfo groups and carboxy groups are represented in the form of their free acids. Moreover, unless otherwise particularly stated hereinafter, the "coloring matter or a salt thereof" contained in each ink composition that constitutes the ink set of the present invention is expediently referred to as "coloring matter" including both the coloring matter and the salt thereof.

The ink set for use in the ink jet recording method of the present invention includes at least two ink compositions: a) a magenta ink composition and b) a cyan ink composition, each containing a compound having a specific structure.

Due to including these two ink compositions each having a different color, the ink set of the present invention is superior in color reproducibility, and incomparable color reproducibility is enabled particularly in a hue range of magenta-blue-cyan.

The magenta ink composition a) included in the ink set of the present invention contains the compound represented by the above formula (1) or a salt thereof. Due to containing the compound, superior coloring properties, and very favorable ink discharge stability can be attained. In addition, color reproducibility in a hue range of particularly magenta-blue-cyan can be prominently improved. It is to be noted that the compound can be synthesized according to a method described in Example 18 of Patent Document 10.

The total content of the compound represented by the above formula (1) in the magenta ink composition a) is preferably 0.5 to 10% by mass. When the total content is less than 0.5% by mass, attaining sufficient color reproducibility may fail, whereas when the total content is greater than 10% by mass, storage stability and/or discharge stability may be inferior. From a similar viewpoint, the total content is more preferably 2 to 6% by mass.

Also, the magenta ink composition a) used in the ink set of the present invention may contain another coloring agent for the purpose of adjustment of the color tone, in a range not leading to impairment of the effects of the present invention.

As the coloring agent which may be used for adjusting the color tone, for example, reactive dyes such as C. I. Reactive Orange 5, 9, 12, 35, 45, 99, and the like are exemplified as specific examples of orange dyes. Furthermore, specific examples of the acidic dye include C. I. Acid Orange 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168, and the like. Moreover, specific examples of the direct dye include C. I. Direct Orange 17, 26, 102, and the like.

With respect to red dyes, specific examples of the reactive dye include C. I. Reactive Red 3, 3:1, 4, 13, 24, 29, 31, 33, 125, 151, 206, 218, 226, 245, and the like. In addition, specific examples of the acidic dye include C. I. Acid Red 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, and the like. Furthermore, specific examples of the direct dye include C. I. Direct Red 2, 4, 6, 9, 17, 23, 26, 28, 31, 39, 54, 55, 57, 62, 63, 64, 65, 68, 72, 75, 76, 79, 80, 81, 83, 83:1, 84, 89, 92, 95, 99, 111, 141, 173, 180, 184, 207, 211, 212, 214, 218, 221, 223, 224, 225, 226, 227, 232, 233, 240, 241, 242, 243, 247, and the like.

With respect to violet dyes, specific examples of the reactive dye include C. I. Reactive Violet 1, 24, and the like. Moreover, specific examples of the acidic dye include C. I. Acid Violet 17, 19, 21, 42, 43, 47, 48, 49, 54, 66, 78, 90, 97, 102, 109, 126, and the like. Furthermore, specific examples of the direct dye include C. I. Direct Violet 7, 9, 47, 48, 51, 66, 90, 93, 94, 95, 98, 100, 101, and the like. Additionally, other dye may be further included.

The blend ratio of the compound represented by the above formula (1) or a salt thereof to the orange dye, red dye, or violet dye as another coloring agent on mass basis is typically 50/50 to 100/0, preferably 75/25 to 100/0, and more preferably 90/10 to 100/0.

The coloring agent contained in the cyan ink composition b) included in the ink set of the present invention is not particularly limited, and C. I. Direct Blue 86, 87, 199, C. I. Acid Blue 249 or the like may be used and a compound represented by the above general formula (2) is particularly preferably used, whereby an ink set more markedly exhibiting the effects of the present invention can be provided. With respect to color reproducibility in particular, reproducibility can be improved in a hue range of magenta-blue-cyan.

It is to be noted that the average value of the sum in connection with the description of a, b, c and d in the above general formula (2) means an average value of the number of sulfo group(s) per molecule in the entirety of the compound.

The total content of the coloring agent in the total mass of the above cyan ink composition b) is preferably 0.5 to 10% by mass. When the total content is less than 0.5% by mass, attaining sufficient color reproducibility may fail, whereas when the total content is greater than 10% by mass, storage stability and/or discharge stability may be inferior. From a similar viewpoint, the total content is more preferably 2 to 6% by mass.

Also, the cyan ink composition b) used in the ink set of the present invention may contain another coloring agent for the purpose of adjustment of the color tone, in a range not leading to impairment of the effects of the present invention.

For example, with respect to violet dyes, specific examples of the reactive dye include C. I. Reactive Violet 1, 24, and the like. Moreover, specific examples of the acidic dye include C. I. Acid Violet 17, 19, 21, 42, 43, 47, 48, 49, 54, 66, 78, 90, 97, 102, 109, 126, and the like. Furthermore, specific examples of the direct dye include C. I. Direct Violet 7, 9, 47, 48, 51, 66, 90, 93, 94, 95, 98, 100, 101, and the like.

With respect to blue dyes, specific examples of the reactive dye include C. I. Reactive Blue 2, 5, 10, 13, 14, 15, 15:1, 49, 63, 71, 72, 75, 162, 176, and the like. In addition, specific examples of the acidic dye include C. I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, 350, and the like. Furthermore, specific examples of the direct dye include C. I. Direct Blue 1, 15, 22, 25, 41, 76, 77, 80, 86, 87, 90, 98, 106, 108, 120, 158, 163, 168, 199, 200, 201, 202, 226, and the like.

With respect to green dyes, specific examples of the reactive dye include C. I. Reactive Green 5, 8, 19, and the like. Moreover, specific examples of the acidic dye include C. I. Acid Green 9, 12, 16, 19, 20, 25, 27, 28, 40, 43, 56, 73, 81, 84, 104, 108, 109, and the like. Additionally, other dye may be further included.

The blend ratio of the coloring agent to be predominant one such as the compound represented by the above general formula (2) to the violet dye, the blue dye or the green dye as another coloring agent on mass basis is typically 50/50 to 100/0, preferably 75/25 to 100/0, and more preferably 90/10 to 100/0.

In a preferred embodiment of the ink set of the present invention for ink jet recording, the magenta ink composition a) contains the compound represented by the above formula (1) in an amount of 0.5 to 10% by mass, and the cyan ink composition b) contains the compound represented by the above general formula (2) in an amount of 0.5 to 10% by mass, respectively. In a more preferred embodiment, the magenta ink composition a) contains the compound represented by the above formula (1) in an amount of 2 to 6% by mass, and the cyan ink composition b) contains the compound represented by the above general formula (2) in an amount of 2 to 6% by mass, respectively.

The ink set of the present invention can realize full color printing by providing an ink set including four ink compositions each of a different color in which yellow and black ink compositions are included in addition to the two ink compositions of magenta and cyan colors. Coloring agents contained in the yellow and black ink compositions are not particularly limited and may be well-known compounds; however, dyes are more preferred than pigments, and direct dyes are still more preferred.

With respect to the coloring agent contained in the yellow ink composition which may be used when the ink set of the present invention is used as an ink set including four ink compositions each of a different color, specific examples of the reactive dye include C. I. Reactive Yellow 2, 3, 18, 81, 84, 85, 95, 99, 102, and the like. In addition, specific examples of the acidic dye include C. I. Acid Yellow 1, 3, 11, 17, 18, 19, 23, 25, 36, 38, 40, 40:1, 42, 44, 49, 59, 59:1, 61, 65, 72, 73, 79, 99, 104, 110, 159, 169, 176, 184, 193, 200, 204, 207, 215, 219, 219:1, 220, 230, 232, 235, 241, 242, 246, and the like. Furthermore, specific examples of the direct dye include C. I. Direct Yellow 8, 11, 12, 21, 28, 33, 39, 44, 49, 50, 85, 86, 87, 88, 89, 98, 100, 110, 144, 146, and the like. Of these, C. I. Direct Yellow 132 is preferred. Moreover, the content of the coloring agent in the total mass of the yellow ink composition is typically 0.5 to 10% by mass, and preferably 2 to 6% by mass.

With respect to the coloring agent contained in the black ink composition which may be used when the ink set of the present invention is used as an ink set including four ink compositions each of a different color, specific examples of the reactive dye include C. I. Reactive Black 1, 8, 23, 39, and the like. In addition, specific examples of the acidic dye include C. I. Acid Black 1, 2, 3, 24, 24:1, 26, 31, 50, 52, 52:1, 58, 60, 63, 107, 109, 112, 119, 132, 140, 155, 172, 187, 188, 194, 207, 222, etc., C. I. Food Black 1, 2, and the like. Additionally, specific examples of the direct dye include C. I. Direct Black 17, 19, 22, 31, 32, 51, 62, 71, 74, 112, 113, 154, 168, 195, and the like. Of these, C. I. Food Black 2, C. I. Direct Black 19, 168 are preferred. Also, the content of the coloring agent in the total mass of the black ink composition is typically 0.5 to 10% by mass, and preferably 2 to 6% by mass.

In the black ink composition, a mixed dye may be also used as a coloring agent which includes a blue dye as a principal component blended with orange and red dyes. Moreover, other dye may be further blended in the black ink composition for the purpose of adjusting the color tone.

With respect to the orange dye as a coloring agent blended in the black ink composition, specific examples of the reactive dye include C. I. Reactive Orange 5, 9, 12, 35, 45, 99, and the like. In addition, specific examples of the acidic dye include C. I. Acid Orange 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168, and the like. Moreover, specific examples of the direct dye include C. I. Direct Orange 17, 26, 102, and the like.

With respect to brown dyes, specific examples of the reactive dye include C. I. Reactive Brown 2, 8, 9, 17, 33, and the like. In addition, specific examples of the acidic dye include C. I. Acid Brown 2, 4, 13, 14, 19, 28, 44, 123, 224, 226, 227, 248, 282, 283, 289, 294, 297, 298, 301, 355, 357, 413, and the like.

With respect to red dyes, specific examples of the reactive dye include C. I. Reactive Red 3, 3:1, 4, 13, 24, 29, 31, 33, 125, 151, 206, 218, 226, 245, and the like. In addition, specific examples of the acidic dye include C. I. Acid Red 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, and the like. Moreover, specific examples of the direct dye include C. I. Direct Red 2, 4, 6, 9, 17, 23, 26, 28, 31, 39, 54, 55, 57, 62, 63, 64, 65, 68, 72, 75, 76, 79, 80, 81, 83, 83:1, 84, 89, 92, 95, 99, 111, 141, 173, 180, 184, 207, 211, 212, 214, 218, 221, 223, 224, 225, 226, 227, 232, 233, 240, 241, 242, 243, 247, and the like.

With respect to violet dyes, specific examples of the reactive dye include C. I. Reactive Violet 1, 24, and the like. In addition, specific examples of the acidic dye include C. I. Acid Violet 17, 19, 21, 42, 43, 47, 48, 49, 54, 66, 78, 90, 97, 102, 109, 126, and the like. Moreover, specific examples of the direct dye include C. I. Direct Violet 7, 9, 47, 48, 51, 66, 90, 93, 94, 95, 98, 100, 101, and the like.

With respect to blue dyes, specific examples of the reactive dye include C. I. Reactive Blue 2, 5, 10, 13, 14, 15, 15:1, 49, 63, 71, 72, 75, 162, 176, and the like. In addition, specific examples of the acidic dye include C. I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, 350, and the like. Furthermore, specific examples of the direct dye include C. I. Direct Blue 1, 15, 22, 25, 41, 76, 77, 80, 86, 87, 90, 98, 106, 108, 120, 158, 163, 168, 199, 200, 201, 202, 226, and the like.

With respect to green dyes, specific examples of the reactive dye include C. I. Reactive Green 5, 8, 19, and the like. In addition, specific examples of the acidic dye include C. I. Acid Green 9, 12, 16, 19, 20, 25, 27, 28, 40, 43, 56, 73, 81, 84, 104, 108, 109, and the like.

In particular, a blend of orange, red and blue dyes is preferred. Also, the total content of the coloring agent in the total mass of the black ink composition may fall within the aforementioned range including these coloring agents which may be blended.

As the coloring agent contained in the black ink composition which may be used when the ink set of the present invention is used as the ink set including four ink compositions each of a different color, a black pigment may be also used. The black pigment is preferably a carbon black pigment such as furnace black, lamp black, acetylene black or channel black. Specific examples of the carbon black include Raven 760 ULTRA, Raven 780 ULTRA, Raven 790 ULTRA, Raven 1060 ULTRA, Raven 1080 ULTRA, Raven 1170, Raven 1190 ULTRA II, Raven 1200, Raven 1250, Raven 1255, Raven 1500, Raven 2000, Raven 2500 ULTRA, Raven 3500, Raven 5000 ULTRA II, Raven 5250, Raven 5750, Raven 7000 (manufactured by Columbia Carbon Co., Ltd); Monarch 700, Monarch 800, Monarch 880, Monarch 900, Monarch 1000, Monarch 1100, Monarch 1300, Monarch 1400, Regal 1330R, Regal 1400R, Regal 1660R, Mogul L (manufactured by Cabot Corporation); Color Black FW1, Color Black FW2, Color Black FW2V, Color Black FW200, Color Black 5150, Color Black S160, Color Black 5170, Printex 35, Printex U, Printex V, Printex 140U, Printex 140V, Special Black 4, Special Black 4A, Special Black 5, Special Black 6 (manufactured by Dexa Co., Ltd.); MA7, MA8, MA100, MA600, MCF-88, No. 25, No. 33, No. 40, No. 47, No. 52, No. 900, No. 2300 (manufactured by Mitsubishi Chemical Corporation); and the like.

In general, the pigment is preferably dispersed in an aqueous solvent by a dispersant. As the dispersant used for the dispersion, a water soluble resin is used, which has an average molecular weight falling within the range of preferably 1,000 to 30,000, and more preferably 5,000 to 20,000. In addition, the acid value falls within the range of preferably 50 to 500, and more preferably 80 to 300. Specific examples of such a dispersant include block copolymers, random copolymers and graft copolymers or salts thereof, consisting of at least two or more monomers selected from e.g., styrene, a styrene derivative, vinylnaphthalene, a vinylnaphthalene derivative, acrylic acid, an acrylic acid derivative, maleic acid, a maleic acid derivative, itaconic acid, an itaconic acid derivative, fumaric acid, a fumaric acid derivative, vinyl acetate, vinylpyrrolidone, acrylamide and a derivative thereof, and the like.

The resin used as the pigment dispersant is contained within the range of preferably 0.1 to 5% by mass, and more preferably 0.1 to 2.5% by mass with respect to the total mass of the ink composition.

In a method of dispersing a pigment, use of a sand mill (i.e., beads mill), a roll mill, a ball mill, a paint shaker, an ultrasonic disperser, Microfluidizer or the like may be included. Of these, a sand mill (i.e., beads mill) is preferably used. Furthermore, preparation of a pigment dispersion liquid using a sand mill (i.e., beads mill) is preferably carried out under a condition in which a filling rate of the beads is increased with use of beads having a small diameter (diameter: 0.01 mm to 1 mm). By carrying out dispersion under such conditions, the particle size of the pigment can be decreased, and thus a dispersion liquid having favorable dispersibility can be obtained. In addition, after the preparation of the dispersion liquid, components having a grater particle size such as pigment may be preferably removed by filtration, centrifugal separation or the like. Moreover, for the purpose of inhibiting bubbling, etc., during preparing the dispersion liquid, an antifoaming agent of a silicone type, acetylene glycol type or the like may be added in a slight amount.

As the black pigment, a self dispersion pigment into which a hydrophilic functional group was introduced onto the surface of the pigment may be used. Specific examples of the self dispersion pigment include BONJET CW-1 (manufactured by Orient Chemical Industries Co., Ltd.); Aquajet-Black 001, Aquajet-Black 162 (manufactured by Tokai Carbon Co., Ltd.); Cabo-jet 200, Cabo-jet 300 (manufactured by Cabot Corporation); and the like.

The ink set of the present invention may be provided as an ink set of 5 to 8 colors by adding ink compositions of light magenta, light cyan, light yellow, light black, etc., which may be generally referred to as "special color", as needed, to the aforementioned ink set of four colors, i.e., the ink set including each of ink compositions of magenta, cyan, yellow and black, whereby printing with more variable hue may be also realized.

As the ink compositions of the special colors described above, i.e., light magenta, light cyan, light yellow and light black, ink compositions prepared by reducing the concentration of the dye contained in the aforementioned four ink compositions each of a different color, i.e., each of the ink compositions of magenta, cyan, yellow and black, may be used. The ratio of the concentration of the dye on mass basis of the ink compositions of the special colors to the concentration of the dye of each of the four ink compositions of each different color is typically no greater than ½, preferably no greater than ¼, and more preferably no greater than ⅙, whereas the lower limit may be about 1/20, and preferably 1/10.

Furthermore, the coloring agents to be contained in the light magenta ink, light cyan ink, light yellow ink and light black ink compositions are preferably the same as those contained in the four ink compositions of each different color, i.e., magenta, cyan, yellow and black, respectively.

The dye used in the foregoing may also be a dye in the form of: powder; block; wet cake or the like. There are such reactive dyes that are commercially available having a variety of qualities such as powder for industrial dyeing, liquid products for textile printing, and dyes for use in ink jet textile printing; and their production method, purity and the like vary, respectively. Some of them may contain an inorganic salt such as sodium chloride or sodium sulfate in a considerable amount (about 10% to 40% by mass in total mass of the product). Each ink composition that constitutes the ink set of the present invention is preferably prepared using a material including impurities as low as possible in order to minimize adverse effects on storage stability and accuracy of discharge from ink jet printers. Additionally, water not purified particularly and the like may contain metal ions such as a calcium ions and magnesium ions; therefore, the ions and the like will be included in the ink composition also when prepared using such water or the like, although the amount of the contaminants may be slight. For the sake of simplicity, the aforementioned inorganic salts and metal ions altogether are referred to as "inorganic impurities" herein below. These inorganic impurities not only significantly deteriorate storage stability and solubility of the dye in the ink composition and the like, but also may be the cause of corrosion and abrasion of ink jet printer heads. In order to eliminate these inorganic impurities, it is preferred that a well-known process such as an ultrafiltration process, a reverse osmosis process or an ion exchange process be utilized to eliminate the inorganic impurities included in the ink composition as far as possible. The content of the inorganic impurities included in the total mass of the ink composition is generally no more than 1% by mass, preferably no more than 0.5% by mass, and more preferably no more than 0.1% by mass. Alternatively, the content may be 0% by mass.

The salts of the compounds represented by the above formula (1) and the above general formula (2) are salts of an inorganic or organic cation. Specific examples of the inorganic salt among the foregoing include alkali metal salts, alkaline earth metal salts, and ammonium salts. Preferred inorganic salts include salts of lithium, sodium or potassium, and ammonium salts. Furthermore, the salt of the organic cation is exemplified by salts of a quaternary ammonium ion represented by the following general formula (3), but not limited thereto. Also, a free acid, a tautomer thereof, and a mixture of various types of the salts are acceptable. For example, a mixture of any combination such as a mixture of a sodium salt with an ammonium salt, a mixture of a free acid with a sodium salt, and a mixture of a lithium salt, a sodium salt and an ammonium salt may be used. Physical properties such as solubility may vary depending of the type of the salt, and as needed, the type of the salt may be appropriately selected, or in the case in which a plurality of salts, etc., are included, a mixture having physical properties to meet the needs can be obtained by changing the proportion of them.

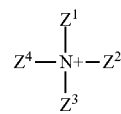

(3)

In the general formula (3), $Z^1$, $Z^2$, $Z^3$ and $Z^4$ each independently represent a group selected from the group consisting of a hydrogen atom, an alkyl group, a hydroxyalkyl group, and a hydroxyalkoxyalkyl group.

Specific examples of the alkyl group which may be represented by $Z^1$, $Z^2$, $Z^3$ and $Z^4$ in the general formula (3) include methyl, ethyl, n-propyl, isopropyl, n-butyl, isobutyl, sec-butyl, tert-butyl and the like; specific examples of the hydroxyalkyl group include hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; and examples of the hydroxyalkoxyalkyl group include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl. Of these, hydroxyethoxy C1-C4 alkyl is preferred. Particularly preferred examples include a hydrogen atom; methyl; hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; hydroxyethoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of combinations of $Z^1$, $Z^2$, $Z^3$ and $Z^4$ preferred as the compound represented by the above general formula (3) are shown in Table 1 below.

TABLE 1

| Compound No. | $Z^1$ | $Z^2$ | $Z^3$ | $Z^4$ |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |
| 1-11 | CH3 | —C2H4OH | CH3 | —C2H4OH |
| 1-12 | CH3 | —CH2CH(OH)CH3 | CH3 | —CH2CH(OH)CH3 |

In order to produce desired salts of the compounds represented by the above formula (1) and the above general formula (2), a desired inorganic salt or salt of an organic cation may be added after a reaction to the reaction liquid to permit salt precipitation, or a corresponding salt solution may be prepared by adding a mineral acid such as hydrochloric acid to isolate in the form of a free acid, followed by washing as needed with water, acidic water, an aqueous organic medium or the like to remove the inorganic salt, and thereafter neutralizing in an aqueous medium with a desired inorganic or organic base. Herein, the acidic water is exemplified by mineral acids such as sulfuric acid and hydrochloric acid, and organic acids such as acetic acid dissolved in water to prepare an acidic solution. Moreover, the aqueous organic medium means an organic substance that contains water and that is miscible with water, as well as organic solvents, generally referred to, that are miscible with water, and the like. Specific examples of the aqueous organic medium include water soluble organic solvents described later, and the like, but an organic substance not classified as a solvent in general can be also used as needed as long as it is miscible with water. Examples of the organic substance not classified as a solvent in general include urea, saccharide, and the like.

Examples of the inorganic salt include alkali metal salts such as lithium chloride, sodium chloride and potassium chloride, ammonium salts such as ammonium chloride and ammonium bromide. Examples of the salt of the organic cation include halogen salt of organic amines, and the like. Examples of the inorganic base include hydroxides of alkali metals such as lithium hydroxide, sodium hydroxide and potassium hydroxide, ammonium hydroxide, as well as carbonates of alkali metals such as lithium carbonate, sodium carbonate and potassium carbonate, and the like. Examples of the organic base include organic amines such as, e.g., salts of quaternary ammoniums represented by the above general formula (3) such as diethanolamine and triethanolamine, and the like, but not limited thereto.

The ink composition that constitutes the ink set of the present invention will be explained below. Each ink composition that constitutes the ink set of the present invention is capable of staining a material composed of cellulose. In addition, other materials having a carbonamide bond can be stained, and each ink composition that constitutes the ink set of the present invention can be broadly used in staining leathers, fabrics, papers, and the like.

It is preferred that each ink composition that constitutes the ink set of the present invention has a viscosity at 25° C. as measured with an E type viscometer in the range of generally 3 to 20 mPa·s. Similarly, the surface tension of these ink compositions preferably falls within the range of generally 20 to 40 mN/m as measured with a plate method. The viscosity of each of the ink compositions may be adjusted to an appropriate value within the above range, taking into consideration flight characteristics of the ink droplets, the amount of discharge, response speed, characteristics of the ink jet head and the like of the printer used.

Each ink composition that constitutes the ink set of the present invention contains a water soluble organic solvent. The water soluble organic solvent has a function as a viscosity adjusting agent or a drying inhibitor. Moreover, when the ink composition that constitutes the ink set of the present invention contains a reactive dye, it is preferred that the water soluble organic solvent is nonreactive with the dye in the ink composition. Also, in order to prevent clogging at the nozzle in the ink jet printer, and the like, a water soluble organic solvent having a high wetting effect is preferred. It is to be noted that in the case of the ink composition not containing a reactive dye, it is not necessary to employ a water soluble organic solvent that is nonreactive with the reactive dye.

As the water soluble organic solvent described above, polyhydric alcohols, pyrrolidones and the like may be exemplified. As the polyhydric alcohols, for example, C2 to C6 polyhydric alcohols having two to three alcoholic hydroxyl groups, poly C2 to C3 alkylene glycols having four or more repeating units and having a molecular weight of no higher than about 20,000, and preferably liquid polyalkylene glycols, etc., may be exemplified. Among these, C2-C3 alkylene glycols and pyrrolidones are preferred, and the formers are more preferred.

Specific examples of the water soluble organic solvent include: C2 to C6 polyhydric alcohols having two to three alcoholic hydroxyl groups such as glycerin, 1,3-pentanediol and 1,5-pentanediol; polyglyceryl ethers such as diglycerin and polyglycerin; polyoxy C2-C3 alkylene polyglyceryl ethers such as polyoxyethylene polyglyceryl ether and polyoxypropylene polyglyceryl ether; mono-, di-, or tri-C2-C3 alkylene glycols such as ethylene glycol, diethylene glycol, triethylene glycol, propylene glycol and polyethylene glycol; poly C2-C3 alkylene glycols such as polyethylene glycol and polypropylene glycol; pyrrolidones such as 2-pyrrolidone and N-methyl-2-pyrrolidone; and the like. Among these, glycerin, diethylene glycol, propylene glycol, isopropyl alcohol, and 2-pyrrolidone are preferred.

The water soluble organic solvent is used either alone or in combination.

Each ink composition that constitutes the ink set of the present invention may further contain in addition to the aforementioned water soluble organic solvent, agents for preparing inks such as, for example, a surfactant, a pH adjusting agent, and a preservative fungicide.

The surface tension of the ink compositions is preferably adjusted with any one of a variety of surfactants i.e., anionic surfactants, cationic surfactants, amphoteric surfactants, nonionic surfactants and the like.

Examples of the anionic surfactant include alkylsulfocarboxylic acid salts, α-olefin sulfonic acid salts, polyoxyethylene alkyl ether acetic acid salts, N-acylamino acids or salts thereof, N-acylmethyltaurine salts, alkylsulfate polyoxyalkyl ether sulfuric acid salts, alkylsulfate polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly4-vinylpyridine derivatives, and the like.

Examples of the amphoteric surfactant include lauryldimethylamino acetate betaine, 2-alkyl-N-carboxymethyl-N-hydroxyethylimidazolinium betaine, coconut oil fatty acid amidopropyldimethylamino acetate betaine, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol; and the like. Other specific examples include trade names Surfynol 104, 105PG50, 82, 420, 440, 465, 485, Olfine STG manufactured by Nissin Chemical Co., Ltd.; and the like. The surfactant is preferably of Surfynol series, and more preferably Surfynol 104PG50 and Surfynol 440.

It is preferred that each ink composition that constitutes the ink set of the present invention further contains triethanolamine as a pH adjusting agent. The content of triethanolamine in the total mass of the each ink composition is typically 0.01 to 2% by mass, and preferably 0.05 to 1.0% by mass.

Furthermore, to each ink composition that constitutes the ink set of the present invention may be added an agent for preparing inks such as a preservative fungicide; a pH adjusting agent other than triethanolamine; and the like if necessary. These agents for preparing inks may be added in an amount of typically about 0 to 10% by mass, and preferably about 0.05 to 5% by mass in total, relative to the total mass of the ink composition.

Examples of the preservative fungicide include sodium dehydroacetate, sodium benzoate, sodium pyridinethione-1-oxide, zinc pyridinethione-1-oxide, 1,2-benzisothiazolin-3-one, 1-benzisothiazolin-3-one amine salts, and the like. Additionally, other specific examples include Proxel GXL manufactured by Avecia, Inc., and the like, and a preferable examples is Proxel GXL.

Examples of the pH adjusting agent include alkali hydroxides such as sodium hydroxide, potassium hydroxide, and lithium hydroxide; tertiary amines such as diethanolamine, dimethylethanolamine, and diethyl ethanolamine; tris(hydroxymethyl)aminomethane, and the like.

Each ink composition that constitutes the ink set of the present invention may be prepared by mixing the aforementioned each component with water appropriately, by a method well known per se, such as stirring.

Each ink composition that constitutes the ink set of the present invention contains at least one or more types of the dye as the coloring matter, water, and the water soluble organic solvent in the total mass thereof. It is preferred that the each ink composition further contains a pH adjusting agent in addition thereto.

The content of each component in the total mass of the each ink composition is described below, and any of these is on mass basis.

The content of the dye contained as a coloring matter is typically 0.5 to 10%, and preferably 2 to 6%.

The proportion of the water soluble organic solvent contained is similarly, typically 1 to 50%, and preferably 5 to 40%. The remainder other than the aforementioned components is water.

In addition, when the pH adjusting agent, preferably triethanolamine is further contained, the proportion may be similar to the amount described above.

As the other agents for preparing inks which may be contained in the each ink composition, preferably a nonionic surfactant, and a preservative fungicide are included. When these components are contained, the proportion in total is 0 to 10%, and preferably 0.05 to 5% based on the total mass of the ink composition.

Each ink composition that constitutes the ink set of the present invention is obtained by mixing as needed the aforementioned components, respectively, and stirring the mixture until the solid contents such as the dye are dissolved. When used in ink jet textile printing, it is preferred to use the each ink composition from which contaminants were eliminated by filtrating with a membrane filter or the like. The pore size of the membrane filter is typically 1 to 0.1 μm, and preferably 0.5 to 0.1 μm.

It is to be noted that the type of the water soluble organic solvent and agents for preparing inks contained in the each ink composition may be selected each independently from the above illustrative examples, but to use the same components is preferred. Moreover, the contents of the coloring agent, the water soluble organic solvent, agents for preparing inks and the like in each ink composition are not necessarily the same for each color, and are preferably adjusted ad libitum taking into consideration the viscosity and the like of the composition, depending on the properties, etc., of the coloring agent contained.

The colored body of the present invention means a substance colored by the ink set of the present invention. The material of the colored body is not particularly limited, and may be any one which can be colored such as, for example, communication sheets such as papers and films, fibers as well as cloths (cellulose, nylon, wool, etc.), leathers, substrates for color filters and the like, but not limited thereto. As the coloring method, an ink jet recording method in which an ink jet printer is used may be employed.

EXAMPLES

Hereinafter, the present invention will be specifically explained by way of Examples, but the present invention is not in any way limited to the following Examples. In Examples, unless otherwise stated in particular, the term "part" means "part by mass", and "%" means "% by mass", respectively.

Example 1

Into a four-necked flask equipped with a condenser were charged 40 parts of sulfolane, and the temperature was elevated to 160° C. over 1 hour. Thereto were added 40 parts of 4-sulfophthalic acid, 4.5 parts of ammonium chloride, 55 parts of urea, 0.5 parts of ammonium molybdate and 6 parts of cupric chloride, and the mixture was stirred at the same temperature for 8 hrs. After the reaction liquid was cooled to 40° C., the target product was filtrated using Nutsche, and washed with 400 parts of methanol. Subsequently, 300 parts of water were added to the wet cake obtained, and the pH was adjusted to 10 with a 48% aqueous caustic solution. The mixture was then stirred at 80° C. for 1 hour. Thereafter, the pH was adjusted to 3 by adding a 35% aqueous hydrochloric acid solution while stirring, and 80 parts of dietary salt were gradually added thereto. Thus precipitated crystals were filtered off, and washed with 150 parts of a 20% saline solution to obtain 90 parts of a wet cake. Subsequently, 210 parts of methanol were added thereto and the mixture was stirred for 1 hour. The precipitated crystals were filtered off, and washed with 300 parts of a 70% aqueous methanol solution followed by drying to obtain the compound represented by the above general formula (2) (ratio of the number of sulfo groups introduced, 1:2:3:4=5.8:1.0:3.1:17.0; average number of sulfo groups introduced=3.2 (measured on LC-MS); $\lambda$max: 630 nm (in an aqueous solution)).

Example 2

Into a four-necked flask equipped with a condenser were charged 40 parts of sulfolane, and the temperature was elevated to 160° C. over 1 hour. Thereto were added 35 parts of 4-sulfophthalic acid, 5 parts of phthalic anhydride, 55 parts of urea, 0.5 parts of ammonium molybdate and 6 parts of cupric chloride, and the mixture was stirred at the same temperature for 8 hrs. After the reaction liquid was cooled to 40° C., the target product was filtrated using Nutsche, and washed with 400 parts of methanol. Subsequently, 300 parts of water were added to the wet cake obtained, and the pH was adjusted to 10 with a 48% aqueous caustic solution. The mixture was then stirred at 80° C. for 1 hour. Thereafter, the pH was adjusted to 3 by adding a 35% aqueous hydrochloric acid solution while stirring, and 80 parts of dietary salt were gradually added thereto. Thus precipitated crystals were filtered off, and washed with 150 parts of a 20% saline solution to obtain 90 parts of a wet cake. Subsequently, 210 parts of methanol were added thereto and the mixture was stirred for 1 hour. The precipitated crystals were filtered off, and washed with 300 parts of a 70% aqueous methanol solution followed by drying to obtain the compound represented by the above general formula (2) (ratio of the number of sulfo groups introduced, 1:2:3:4=1.0:3.5:8.4:7.5; average number of sulfo groups introduced=3.1 (measured on LC-MS); $\lambda$max: 629 nm (in an aqueous solution)).

Example 3

Into a four-necked flask equipped with a condenser were charged 40 parts of sulfolane, and the temperature was elevated to 160° C. over 1 hour. Thereto were added 25 parts of 4-sulfophthalic acid, 15 parts of phthalic anhydride, 55 parts of urea, 0.5 parts of ammonium molybdate and 6 parts of cupric chloride, and the mixture was stirred at the same temperature for 8 hrs. After the reaction liquid was cooled to 40° C., the target product was filtrated using Nutsche, and washed with 400 parts of methanol. Subsequently, 300 parts of water were added to the wet cake obtained, and the pH was adjusted to 10 with a 48% aqueous caustic solution. The mixture was then stirred at 80° C. for 1 hour. Thereafter, the pH was adjusted to 3 by adding a 35% aqueous hydrochloric acid solution while stirring, and 80 parts of dietary salt were gradually added thereto. Thus precipitated crystals were filtered off, and washed with 150 parts of a 20% saline solution to obtain 90 parts of a wet cake. Subsequently, 210 parts of methanol were added thereto and the mixture was stirred for 1 hour. The precipitated crystals were filtered off, and washed with 300 parts of a 70% aqueous methanol solution followed by drying to obtain the compound represented by the above general formula (2) (ratio of the number of sulfo groups introduced, 1:2:3:4=1.4:1.6:1.6:1.0; average number of sulfo groups introduced=2.4, (measured on LC-MS); $\lambda$max: 623 nm (in an aqueous solution)).

After an ink composition was obtained by mixing the dyes at a composition ratio shown in Table 2 below and stirring the mixture for about 1 hour until the solid contents were dissolved, thus resulting solution was filtered through a 0.45 μm membrane filter (trade name, Cellulose Acetate Filter Paper, manufactured by Advantec Toyo Kaisha, Ltd.,) to prepare an ink composition for tests. In addition, ink sets of combinations of Examples 4 to 7 were produced using each ink composition.

TABLE 2

| Ink Composition | Composition Percentage |
|---|---|
| dye | X parts |
| glycerin | 5.0 parts |
| urea | 5.0 parts |
| 2-pyrrolidone | 4.0 parts |
| isopropyl alcohol | 3.0 parts |
| butylcarbitol | 2.0 parts |
| Surfynol 440 | 0.1 parts |
| sodium hydroxide + water | remainder |
| Total | 100.0 parts |

Example 4

Magenta: the compound represented by the above formula (1) (X=4.0 parts)
Cyan: the compound represented by the above general formula (2)=Example 1 (X=3.0 parts)

Example 5

Magenta: the compound represented by the above formula (1) (X=4.0 parts)
Cyan: the compound represented by the above general formula (2)=Example 2 (X=3.0 parts)

Example 6

Magenta: the compound represented by the above formula (1) (X=4.0 parts)
Cyan: the compound represented by the above general formula (2)=Example 3 (X=3.0 parts)

Example 7

Magenta: the compound represented by the above general formula (1) (X=4.0 parts)
Cyan: C. I. Direct Blue 199 (X=3.0 parts)
As Comparative Examples, dyes for Comparative Examples were mixed similarly to Examples at a composition ratio shown in Table 2, and ink sets of Comparative Examples were obtained by a similar method.

Comparative Example 1

Magenta: C. I. Direct Red 227 (X=4.0 parts)
Cyan: C. I. Direct Blue 199 (X=3.0 parts)

Comparative Example 2

Magenta: C. I. Direct Red 227 (X=4.0 parts)
Cyan: the compound represented by the above general formula (2)=Example 1 (X=3.0 parts)

Ink Jet Printing

Using the ink sets obtained as described above, ink jet printing was carried out by an ink jet printer PIXUS iP4100 (trade name, manufactured by Canon, Inc.) on premium plain paper (manufactured by Ziegler Papier AG, trade name Ziegler Z-plot 650).

Upon the printing, an image pattern was produced such that the reflected density was obtained in several-step gradation, whereby a printed matter was obtained.

Evaluation of Hue of Each Printed Matter

The hue was evaluated on each of Examples and Comparative Examples obtained as described above. The hue was determined by colorimetric measurement of a gradational part having the highest chroma saturation on the printed matter using a colorimetric photometer manufactured by GRETAG-MACBETH AG, trade name SpectroEye to measure a* and b*. In addition, chroma saturation C* was determined from thus derived values according to the following formula. Greater values of the chroma saturation suggest more favorable results, indicating higher brilliance.

$$C^* = [(a^*)^2 + (b^*)^2]^{1/2}$$

The colorimetric results of magenta-blue-cyan reproduced by the ink set of Example 4 are shown in Table 3.

TABLE 3

|  | a* | b* | C* |
| --- | --- | --- | --- |
| magenta | 64.5 | −4.5 | 64.6 |
| blue | 2.5 | −46.9 | 47.0 |
| cyan | −26.7 | −49.0 | 55.7 |

The colorimetric results of magenta-blue-cyan reproduced by the ink set of Example 5 are shown in Table 4.

TABLE 4

|  | a* | b* | C* |
| --- | --- | --- | --- |
| magenta | 64.5 | −4.5 | 64.6 |
| blue | −1.8 | −45.6 | 45.7 |
| cyan | −33.3 | −47.2 | 57.8 |

The colorimetric results of magenta-blue-cyan reproduced by the ink set of Example 6 are shown in Table 5.

TABLE 5

|  | a* | b* | C* |
| --- | --- | --- | --- |
| magenta | 64.5 | −4.5 | 64.6 |
| blue | 1.8 | −46.9 | 47.0 |
| cyan | −29.3 | −48.9 | 57.0 |

The colorimetric results of magenta-blue-cyan reproduced by the ink set of Example 7 are shown in Table 6.

TABLE 6

|  | a* | b* | C* |
| --- | --- | --- | --- |
| magenta | 64.5 | −4.5 | 64.6 |
| blue | 3.8 | −45.2 | 45.4 |
| cyan | −28.6 | −47.3 | 55.3 |

The colorimetric results of magenta-blue-cyan reproduced by the ink set of Comparative Example 1 are shown in Table 7.

TABLE 7

|  | A* | b* | C* |
| --- | --- | --- | --- |
| Magenta | 59.9 | −4.8 | 60.1 |
| blue | 5.7 | −42.8 | 43.2 |
| cyan | −28.6 | −47.3 | 55.3 |

The colorimetric results of magenta-blue-cyan reproduced by the ink set of Comparative Example 2 are shown in Table 8.

TABLE 8

|  | a* | b* | C* |
| --- | --- | --- | --- |
| magenta | 59.9 | −4.8 | 60.1 |
| blue | 2.5 | −43.5 | 43.6 |
| cyan | −26.7 | −49.0 | 55.7 |

As is clear from the results shown in Tables 3 to 8, Examples 4 to 7 demonstrating the ink set of the present invention for ink jet recording each exhibited higher chroma saturation as compared with Comparative Examples 1 and 2, in the hue ranges of magenta and blue. In addition, Examples 4 to 6 each exhibited higher chroma saturation as compared with Comparative Examples 1 and 2, in the entire hue range of magenta, blue and cyan. From the foregoing results, the ink sets of Examples of the present invention, as compared with each Comparative Example, exhibited high chroma saturation in a hue range of magenta-blue-cyan, and high quality images were obtained with a broad color reproducible range.

INDUSTRIAL APPLICABILITY

The ink set of the present invention for ink jet recording can provide a printed matter that is superior in color reproducibility in the hue of particularly magenta-blue-cyan.

The invention claimed is:
1. An ink set for ink jet recording comprising two ink compositions each of a different color of a) a magenta ink composition and b) a cyan ink composition, each comprising a dye, water, and a water soluble organic solvent, and the magenta ink composition a) comprising a compound represented by the following formula (1) or a salt thereof,

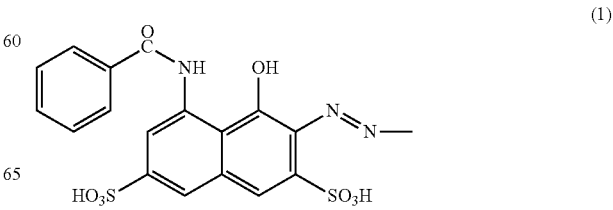

(1)

-continued

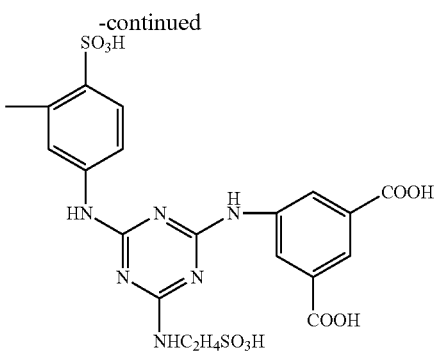

wherein the cyan ink composition b) comprises as a coloring agent a compound represented by the following general formula (2) or a salt thereof,

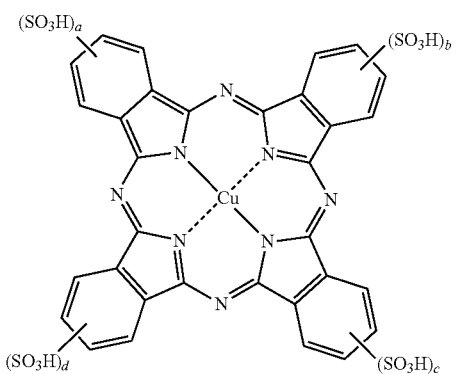

(2)

wherein: a, b, c and d are 0 or 1; a sum of a, b, c and d is no less than 1 and no greater than 4; and an average value of the sum is 2 to 4.

2. The ink set for ink jet recording according to claim 1, wherein a total content of the coloring agent in a total mass of the magenta ink composition a) is 0.5 to 10% by mass, and a total content of the coloring agent in a total mass of the cyan ink composition b) is 0.5 to 10% by mass.

3. The ink set for ink jet recording according to claim 1, wherein a total content of the coloring agent in a total mass of the magenta ink composition a) is 2 to 6% by mass, and a total content of the coloring agent in a total mass of the cyan ink composition b) is 2 to 6% by mass.

4. An ink jet recording method carried out utilizing the ink set for ink jet recording according to claim 1, the method comprising discharging ink droplets of each ink composition included in the ink set, in response to recording signals to allow the droplets to adhere onto the record-receiving material thereby executing recording.

5. The ink jet recording method according to claim 4, wherein the record-receiving material is a communication sheet.

6. A colored body obtained by coloring with the ink set for ink jet recording according to claim 1.

7. The colored body according to claim 6, wherein the coloring is carried out using utilizing an ink jet printer.

8. An ink jet printer equipped with a vessel comprising each ink composition included in the ink set for ink jet recording according to claim 1.

* * * * *